United States Patent Office 2,983,623
Patented May 9, 1961

2,983,623
FLAME PROOFING AGENTS DERIVED FROM METHYLOL PHOSPHORUS POLYMERS

Harold Coates, Wombourn, England, assignor to Albright & Wilson Limited, Warwickshire, England, a company of the United Kingdom No Drawing. Filed Dec. 1, 1959, Ser. No. 856,380
Claims priority, application Great Britain Oct. 5, 1959

10 Claims. (Cl. 117—62)

This invention is an improvement in or modification of the invention claimed in U.S. Patent No. 2,772,188. Said patent claims a process of increasing the extent of polymerization and insolubility of further-polymerizable methylol-phosphorus polymeric materials, by reacting the further-polymerizable polymeric material with ammonia. The nature of the further-polymerizable compounds to be treated is defined in said patent, and the process of the present invention is applicable with the use of the further-polymerizable compounds as so defined.

The reaction which takes place according to the parent patent is in the nature of a cross-linking reaction whereby there is obtained a substance of high molecular weight and insoluble in water. The reaction may be illustrated as follows:

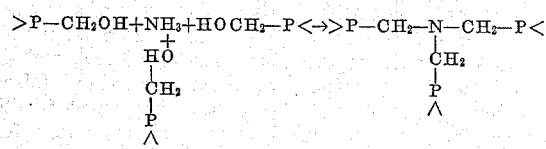

As the polymeric material increases in molecular weight it will become increasingly difficult to react each phosphorus-methylol group trifunctionally with ammonia in the manner shown above and thus in the final product there may be bifunctional and also monofunctional linkages e.g.

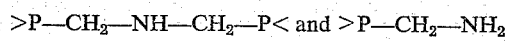

(The ammonia usually being present in excess.)

When the reaction is effected in or upon cellulose materials in order to impart for example flame resistant properties it is undesirable that there should be present such bifunctional and monofunctional linkages to any substantial extent because this would result in reduced fastness to water treatment of the treated cellulose material.

The present invention is essentially concerned with the treatment of cellulose material, especially in the form of fibres, yarns, fabrics, films, pulp, paper, fibreboard or wood for the purpose of improved properties. Such improved properties include increased dimensional stability, improved resistance to creasing in the wet or dry state, modified dyeing properties, improved resistance to rotting, alteration in surface lustre, alteration in handle and drape, improved resistance to abrasion, improved flame resistance and glow resistance.

A simplified flow diagram of the process is as follows:

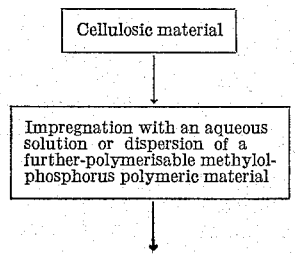

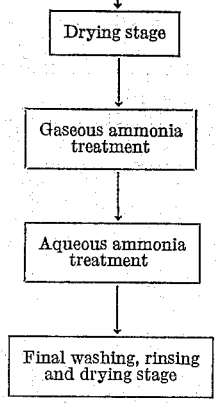

In U.S. Patent No. 2,772,188, it is stated that the ammonia may be employed in the form of gaseous ammonia, ammonium hydroxide, a solution of ammonia in an inert solvent, or as ammonia released in situ by the reaction of a compound capable of releasing ammonia, e.g. an ammonium salt of a weak acid, such as ammonium acetate, or ammonium carbonate. The cellulose material after having been impregnated with an aqueous solution or dispersion of the further polymerizable methylol-phosphorus polymeric material is dried and then treated with the ammonia.

When treating the dried cellulose material with gaseous ammonia the rate of reaction is very slow as it is necessary for the ammonia to diffuse completely throughout the material structure in order to react completely with the methylol-phosphorus polymeric material. It is possible to obtain a fully reacted product by this means but it is usually necessary to maintain the cellulose material in the ammonia atmosphere for some time at room temperature. Moreover the reaction being exothermic in character, under some circumstances the temperature of the cellulose material may get undesirably high.

When treating the dried cellulose material with ammonium hydroxide or ammonium carbonate solution there is a tendency for the further polymerizable methylol phosphorus polymeric material to migrate to the surface of the cellulose material before having reacted with the ammonia to an extent sufficient to render the polymeric material immobile. This is especially the case if the drying of the impregnated cellulose material has not been satisfactorily carried out. On the other hand using an aqueous ammonia system the cross-linking is very rapid and is complete in a few minutes at room temperature. Also being a liquid system the ammonia readily penetrates the cellulose material leaving no uncured areas, and by moving the cellulose material relative to the aqueous system uniformity of ammonia concentration is ensured. Further the aqeous medium serves to absorb the heat given out by the reaction of the ammonia and the polymer and prevents undue rise in temperature.

It will be seen from the above that there are certain disadvantages appertaining to both the gaseous ammonia treatment and the aqueous ammonia treatment.

We have now found that it is possible to take advantage of both the aqueous and gaseous systems thereby obtaining the benefits of each and eliminating many of the disadvantages. This is done, according to the invention, by giving the dried cellulose material an initial treatment by exposing it to the action of gaseous ammonia and following this by subjecting the cellulose material to an aqueous ammonia treatment. The gaseous treatment provides an initial reaction between the ammonia and the methylol-phosphorus material sufficient to render the polymeric material substantially immobile in the cellulose material. The subsequent aqueous ammonia treatment ensure complete penetration by ammonia of those parts of the cellulose material which have been impregnated with the further polymerizable methylol phosphorus polymeric material and hence leaves no uncured or partly cured areas.

The process of the present invention may, therefore, comprise the following steps:

(1) Impregnating a cellulose material with an aqueous solution or dispersion of a further-polymerizable methylol-phosphorus polymeric material as hereinbefore defined;

(2) Drying the treated cellulose material;

(3) Exposing such treated and dried material to gaseous ammonia; and (4) Treating the said material with an aqueous ammonia system.

Whereas any of the further-polymerizable methylol-phosphorus polymeric material referred to in the Patent No. 2,772,188 are satisfactory for the processes of this invention, a particularly suitable polymeric material is the reaction product of teetrakis hydroxy-methyl phosphonium chloride (THPC) and urea. Such a polymeric material or precondensate is stable in storage for well over a year without deterioration and the amount of water and urea in such a precondensate can be varied quite considerably without affecting its utility. However, the proportion of urea should preferably not be above 16 parts of urea to 63 parts of THPC or the stability of the precondensate may diminish. There is an advantage to be gained by buffering the THPC-urea precondensate. This is because the pH of the precondensate is around 0.8 and hence the solution is very acid. In this case if the treated cellulose material is not dried very cautiously the material may suffer acid degradation whereas by raising the pH to 3.5 to 4 such acid degradation is minimized. Suitable materials for use as buffers to achieve this desired effect are sodium acetate, triethanolamine, ammonium acetate, or other ammonium salts of weak acids. In this connection a possible advantage of using ammonium acetate or other ammonium salts of weak acids as buffers is that partial cross-linking may take place during the final stage of the drying operation thereby decreasing the tendency of the polymeric material to migrate to the surface of the cellulose material during the subsequent processing.

The following examples are given for the purpose of illustrating the invention, the parts and percentages mentioned being by weight:

Example 1

A THPC-urea precondensate was prepared by refluxing a solution of 3160 parts THPC and 498 parts urea in 4012 parts water for 30 mins. and then cooling rapidly. To this precondensate was added 20 parts of an non-ionic wetting agent (for example, an alkyl phenyl ethylene oxide condensation product) and 5000 parts of water. A scoured and bleached 8 oz. per square yard cotton 2 x 2 drill fabric was impregnated with this solution and squeezed to retain 74 parts of solution for each 100 parts of dry fabric. The impregnated fabric was dried at 90°–95° C. then exposed for 10 minutes to ammonia vapor by passing it back and forth over a commercial solution of ammonia of sp. gravity .910. The fabric was then treated in a solution of 10 parts ammonia solution of sp. gravity .910 in 90 parts cold water for 10 minutes. The fabric was removed from this solution and without rinsing was washed in a solution of 5 parts soap and 2 parts commercial 100 volume strength hydrogen peroxide in 1000 parts of water for 10 mins. at 40–50° C. then 10 mins. at 90–95° C. before finally being rinsed in hot water, squeezed to remove excess water and dried at 120° C. The dried fabric which showed an increase in weight of 11% compared with the original fabric had excellent resistance to burning and afterglow when tested by a vertical strip flametest such as is described in British Standard 3119; 1959. This property was not impaired after subjecting the fabric to 10 successive 1 hr. boiling washes in a solution of 2 parts soap and 2 parts anhydrous sodium carbonate in 1000 parts water.

Example 2

A THPC-urea precondensate was prepared as described in Example 1, but using 3970 parts THPC, 1004 parts urea and 5056 parts water. To this precondensate was added 6700 parts water. A scoured and raised plain weave 4 oz. per square yard cotton winceyette fabric was impregnated with this solution and squeezed to retain 95 parts solution for each 100 parts of dry fabric. The impregnated fabric was dried at 90° C. then exposed for 5 minutes to ammonia vapor by passing it back and forth over a commercial solution of ammonia of specific gravity .880. The fabric was then immersed in a solution of 50 parts ammonia solution of specific gravity .880 in 50 parts water for 10 minutes at 60° C. The fabric was removed from this solution and without rinsing washed, dried and rinsed as described in Example 1. The dried fabric which showed an increase in weight of 12% compared with the original fabric had excellent resistance to burning when tested by a vertical strip flametest such as described in British Standard 3119; 1959.

Example 3

A THPC-urea precondensate was prepared exactly as described in Example 1. To this precondensate was added 2530 parts water and 345 parts of a solution of ammonia acetate made by dissolving 600 parts of ammonium acetate in 400 parts water. Three samples, A, B, and C, of a scoured and bleached plain weave cotton fabric weighing 4 oz. per square yard were impregnated with this solution and squeezed to retain 73 parts solution for each 100 parts of dry fabric. The samples were dried together at 80° C. and then treated separately as follows. Samples A and C were exposed to ammonia vapor for 10 mins. by standing over a commercial solution of ammonia of specific gravity .910. Sample C was then removed from the vapor whereas Sample A was exposed to the vapor for a further 10 mins. Sample C was impregnated for 10 mins. and sample B for 20 mins. in a solution of 10 parts commercial ammonia solution of specific gravity .910 in 90 parts water. All three samples were then washed, rinsed and dried as described in Example 1. The following table shows the increase in weight, flame-resistant and tear strength properties of the three samples.

| Sample | Ammonia treatment | Increase in weight,[1] percent | Flame-resistance [2] | Tear Strength,[3] gs. |
| --- | --- | --- | --- | --- |
| A | 20 mins. vapor | 1.7 | Burnt | 1,640 |
| B | 20 mins. solution | 0.8 | Burnt | 1,585 |
| C | 10 mins. vapor plus 10 mins. solution. | 10.0 | 3 inches | 1,390 |

[1] Increase in weight of treated sample compared with the original sample.
[2] Char length determined according to the method described in BS 3119, 1959.
[3] Weft tear strength determined using a Elmendorf Ballistic Tear Testing machine.

Example 4

A THPC-urea precondensate was prepared exactly as described in Example 1, and then divided into two halves. To one half was added 1265 parts of water to make solution P and to the other half was added 1265 parts of a solution containing 96 parts triethanolamine dissolved in 1169 parts water to make solution Q. Two samples of a scoured plain weave 4 oz. per square yard cotton fabric were impregnated, one in solution P the other in solution Q, squeezed to retain 73 parts solution for each 100 parts dry fabric, and dried at 110–115° C. The dried samples were exposed to ammonia vapor, treated with ammonia solution, washed and rinsed and dried as described in Example 1. Both samples had good flame-resistance when tested according to British Standard 3119, 1959, but whereas the sample treated with solution P had a weft tear strength of 700 gs. that treated with solution Q containing the triethanolamine had a weft tear strength of 1200 gs., tested using an Elmendorf Ballistic Tear Testing machine. Both samples showed substantially the same increase in weight due to the treatment, sample treated with P increasing by 5.6%, sample treated with Q increasing by 5.9%.

*Example 5*

A THPC-urea precondensate was prepared exactly as described in Example 1. To this precondensate was added 7480 parts water containing 200 parts sodium acetate. A sample of loose scoured American cotton fibre was impregnated with this solution and hydro-extracted to retain 122 parts solution for each 100 parts original fibre. The fibres were roughly opened out by hand, dried at 70–80° C. then exposed for 60 minutes to ammonia vapor by suspending over commercial ammonia of specific gravity .910. Finally, the fibres were immersed for 10 minutes in a solution of 10 parts commercial ammonia solution specific gravity .910 in 90 parts of water before being washed, rinsed and dried as described in Example 1. The treated fibres showed improved resistance to burning so that when carded into a lap the application of a naked flame caused local charring but there was no flash of flame over the surface of the lap such as occurred with a lap made from untreated cotton fibres.

*Example 6*

A sample of loose kapok fibre was treated as described in Example 5, except that to assist the fibres to wet out during impregnation with the THPC-urea precondensate, water, sodium acetate solution an addition was made of 1 part of a non-ionic wetting agent (an alkyl phenyl ethylene oxide condensation product) to every 1000 parts of the impregnating solution. The treated kapok fibres showed improved resistance to burning whilst retaining their natural property of high resistance to wetting. Further the high natural lustre of the fibres was considerably reduced, the treatment having imparted an overall and uniform partially delustred appearance. The treated fibres showed an increase in weight of 12.5% compared with the original fibres.

*Example 7*

A THPC-urea precondensate was prepared as described in Example 2. To this precondensate was added 6700 parts of a solution containing 350 parts ammonium acetate and 6350 parts water. A scoured and vat dyed plain weave linen fabric weighing 6.2 oz. per square yard was impregnated with this solution and squeezed to retain 92 parts solution for each 100 parts of original fabric. The fabric was dried at 95° C. and exposed to ammonia vapor by laying it on top of and then rolling it into a roll with a plain weave cotton fabric weighing 4 oz. per square yard previously impregnated an aqueous solution of ammonium carbonate and dried at 40° C. so that approximately 17 parts of ammonium carbonate solid was deposited on each 100 parts of the cotton fabric. After 10 minutes the linen fabric was removed and immersed in a commercial solution of ammonia of specific gravity .910 at 50° C. for 12 minutes. The fabric was finally washed, rinsed and dried as described in Example 1. The treated fabric had a crisp and full handle which was retained after washing three times in a solution of 5 parts soap in 1000 parts water at 60–80° C. for 20 minutes.

*Example 8*

A THPC-urea precondensate was prepared as described in Example 1. To this precondensate was added 5110 parts of a solution of 400 parts ammonium acetate in 4710 parts water. A cotton organdie fabric weighing 2.2 ozs. per square yd. was impregnated with this solution then squeezed and suction extracted to retain 108 parts solution for every 100 parts of original fabric. The impregnated fabric dried at 50° C. and exposed to ammonia vapor for 15 minutes by suspending over a solution of commercial ammonia of specific gravity .880. The fabric was then immersed in a solution of 30 parts commercial ammonia of specific gravity .880 in 70 parts water at 50° C. for 20 minutes. The fabric was transferred from the ammonia solution without rinsing to a solution of 5 parts soap and 2 parts sodium perborate in 1000 parts water and washed in this solution at 40° C. for 30 minutes, afterwards rinsing in warm water and then cold water before drying at 100–105° C. The treated fabric which showed an increase in weight of 8.4% due to the treatment had improved resistance to burning and complete resistance to glowing. Also the resistance to flat abrasion of the fabric was improved by the treatment. Thus whereas the untreated fabric was rubbed into a hole after 388 revolutions the treated fabric required 452 revolutions to produce an equivalent amount of wear when measured using a ringwear abrasion apparatus with wool serge as the abrasive. The treated fabric had a crisper handle than the original fabric and less lustre.

*Example 9*

A THPC-urea precondensate was prepared as described in Example 1. To this precondensate was added 2875 parts of a solution of 198 parts sodium acetate in 2677 parts water. A sample of bleached and mercerized cotton yarn (2 fold 60s cotton count) was impregnated with this solution and squeezed to retain 95 parts solution for each 100 parts of original yarn. The yarn was dried at 90° C. then exposed to ammonia vapor, immersed in ammonia solution, washed and rinsed as described in Example 8. The treated yarn had greatly improved flame-resistance in that when a lighted match was applied to a single thread suspended vertically the yarn charred but there was no spread of flame or smouldering up the yarn. A sample of the treated yarn and a sample of untreated yarn were immersed in a solution of 5 parts of Polar Brilliant Red G (The Geigy Co. Ltd)., and 5 parts of sodium sulphate (anhydrous) in 1000 parts of water at 90 to 95° C. for 1 hour, with a fabric to liquor ratio of 1:40. After removing the two samples and rinsing in cold water for 20 minutes the treated sample was dyed to a much greater depth of shade than the untreated yarn. Further the dyeing on the treated yarn was more resistant to hot soaping than the dyeing on the untreated yarn.

*Example 10*

A sample of a scoured and bleached plain weave viscose rayon staple fabric weighing approximately 4.5 oz. per square yard was treated as described in Example 1, except that after impregnating, the fabric was squeezed to retain 107 parts of the precondensate solution for each 100 parts of original fabric. The treated fabric which showed an increase in weight of 12.8% charred but did not burn when tested by a vertical strip method as described in British Standard 3119, 1959. The treated fabric had a firm handle and was much less lustrous than the original fabric. All these properties were retained to a high degree after ten 30 minute washes at 40–50° C. in a solution of 2.5 parts soap and 2.5 parts commercial ammonia solution specific gravity .880 in 1000 parts water.

*Example 11*

A sample of a jute sacking cloth was treated as described in Example 7. Samples of the treated and untreated fabric were stretched onto small wooden frames and buried side by side in a garden compost heap. After one month the samples were removed from the heap and the untreated fabric was considerably degraded and in holes. The treated fabric was quite intact and remained so after burial for a further 2 months.

*Example 12*

A THPC-urea precondensate was prepared by refluxing a solution of THPC (3160 parts), urea (498 parts) and water (4012 parts) for 30 minutes and cooling rapidly. To this solution was added 20 parts Lissapol N and 5000 parts water. A 5 yard length of white cotton drill was padded through this solution and gave a pick-up of solution of 74%. The padded cloth was dried carefully on a pin stenter at 90° C. The dried cloth was rolled on to a jig and 0.910 ammonia poured into the bottom so that it did not come in contact with the cloth. The cloth was run back and forth through the ammonia vapor for 10 minutes warming the ammonia liquor as required to ensure a high concentration of vapour. The ammonia was then diluted with water to a concentration of 10%, ensuring that in this case the cloth passed through the aqueous ammonia solution. The cloth was passed through this liquor for 10 mins. and the excess ammonia run to waste. The cloth was rinsed off in cold water and scoured at the boil in a soap-ammonia $H_2O_2$ liquor and finally rinsed off and dried. This cloth had a resin add-on of 11% and was flame resistant, passing BSS 3119:1959. The cloth also passed this test after ten 1 hour boils in ¼% soap-soda solution. The handle, tear strength and abrasion resistance of the treated cloth were good.

*Example 13*

A THPC-urea precondensate was prepared as in Example 12 using THPC (3970 parts), urea (1004 parts) and water (5056 parts), Lissapol N (20 parts) and water (6700 parts). A 5 yard length of 3012 quality plain white cotton winecyette was padded through this solution with a pick-up of 95%. This cloth was dried carefully and cured as in Example 12 but giving 5 mins. in the ammonia vapour and 10 mins. in the ammonia liquor. Washing-off and scouring as in Example 12 gave a cloth of very good finish which was flame resistant according to BSS. 3119:1959 with a resin add-on of 12%. This cloth also passed this standard test after ten 1 hour boils in ¼% soap-soda solution.

*Example 14*

A THPC-urea precondensate was prepared as in Example 12 using THPC (3160 parts), urea (498 parts) and water (4012 parts). To the cold solution was added with stirring BT. 309 (920 parts), sodium acetate (130 parts), Lissapol N (20 parts) and water (5200 parts). A 5 yard length of 3419 quality blue cotton twill was padded in this solution with a pick-up of 83%. This cloth was processed as described in Example 12 giving a very good flame resistant finish with a resin add-on of 12.7%. This cloth was also flame-resistant after ten 1 hour boils in ¼% soap-soda.

*Example 15*

A THPC-melamine precondensate was prepared by adding 223 parts melamine to a boiling solution of 1070 parts THPC in 1710 parts water and refluxing the mixture for 15 mins. and then cooling rapidly. To the precondensate was added 500 parts water. A piece of soft white wood ¼" thick such as is commonly used in the construction of packing cases was immersed in this solution for 30 mins. and then removed and drained of excess liquid. The impregnated wood was dried at 60–70° C. then exposed to ammonia vapor for 30 mins. by suspending it over a commercial solution of ammonia of sp. gravity .880. The wood was then immersed in a solution of 25 parts ammonia solution of specific gravity .880 in 75 parts water for 20 minutes, rinsed 10 minutes in cold water and dried at 60–70° C. The treated wood charred when exposed to a flame but on renewal of the applied flame there was no after-flaming or afterglowing of the wood. Untreated wood exposed to a flame under similar conditions continued to flame and glow after removal of the applied flame. The flame-resistance properties of the treated wood were still apparent after the wood had been submerged for 24 hours in running water and dried.

*Example 16*

A THPC-urea-thiourea precondensate was prepared by refluxing a solution of 630 parts THPC, 84 parts thiourea and 66 parts urea in 800 parts water and cooling rapidly. To this precondensate was added 1000 parts water. A piece of white blotting paper 0.25 mm. thick was sprayed with this solution so that 80 parts solution was applied to each 100 parts blotting paper. The impregnated paper was dried at 105–110° C. and exposed to ammonia vapour by suspending it over a commercial solution of ammonia of specific gravity .880 for 3 mins. The paper was then immersed in the ammonia solution for a further 2 mins. and after removal from this solution was allowed to dry at a room temperature of 20–30° C. When a match flame was applied to the treated paper it charred but on removal of the match flame there was no after-flaming or afterglowing. After immersing in cold water for 12 hours and drying at 40–50° C. these flame and glow resistant properties were not affected.

*Example 17*

A THPC-dicyandiamide precondensate was prepared by refluxing a solution of 756 parts THPC and 180 parts dicyandiamide in 1024 parts water for 30 mins. and cooling rapidly. This precondensate was brushed onto one face of a piece of chipboard 1 inch thick. This chipboard was a product of the type widely used for domestic constructional work and which is made by compressing into board form wood chips and shavings with a binding composition. The treated chipboard was dried at 60–70° C. and exposed to an atmosphere of ammonia vapor by suspending it over a solution of ammonia of specific gravity .910. The board was then sprayed on both sides with a solution of 50 parts of ammonia of specific gravity .910 in 50 parts of water, allowed to stand for 15 minutes, then dried at 60–70° C. The treated board was immersed in cold running water for 48 hours and then dried at 60–70°. The treated board was suspended horizontally with the treated face underneath and a non-luminous Bunsen burner gas flame was applied for 10 minutes to the centre of the treated face. The board was then allowed to cool for 4 hours and the flame-test procedure repeated but this time with the untreated face underneath and the flame applied to this face for 10 minutes. A comparison of the two faces exposed to the flame showed that the area and depth of char were appreciably less on the treated face than on the untreated face. Also it was observed that after removal of the Bunsen flame the treated face showed greater resistance to afterglow than the untreated face.

*Example 18*

A THPC-guanidine precondensate was prepared by refluxing a solution of 6300 parts THPC and 1236 parts guanidine carbonate in 8000 parts water for 35 mins. and cooling rapidly. Into 1000 parts of this precondensate was stirred a slurry consisting of 300 parts paper pulp and 30 parts ammonium acetate with 700 parts water. The resulting slurry was then poured evenly onto a white cotton filter cloth and excess solution was removed by suction, leaving a mat of pulp which contained 105 parts solution for each 100 parts dry pulp. This mat was dried by pressing with a hot iron at 100–105° C. forming a porous paper 0.45 mm. thick. This paper was exposed to ammonia vapor for 5 mins. by sucking through it air which had been previously bubbled through a solution of ammonia of specific gravity .880. The paper was then sprayed with a solution of 45 parts ammonia of specific gravity .880 in 55 parts water so that 50 parts of solution were applied to each 100 parts of paper, and allowed to stand for 10 minutes. The paper was then washed for 5 minutes by sucking through it a cold solution containing 1 part of commercial 100 volume strength hydrogen peroxide in 99 parts water. The paper was finally dried at 70° C. The dried paper charred when a match flame was applied but on removal of the applied flame there was no afterflaming or afterglowing.

What is claimed is:

1. Process for improving the properties of a cellulose material, consisting essentially in incorporating in said material a further-polymerizable methylol-phosphorus polymeric material, containing at least one free methylol group attached to a phosphorus atom, and then exposing the material in the dry state to the action of gaseous ammonia followed by subjecting it to an aqueous ammonia treatment.

2. Process for improving the properties of a cellulose material, consisting essentially of impregnating said material with an aqueous solution of a further-polymerizable methylol-phosphorus polymeric material containing at least one free methylol group attached to a phosphorus atom, drying the treated material, exposing the treated and dried material to gaseous ammonia, and thereafter subjecting said material to an aqueous ammonia treatment.

3. Process of claim 2 in which the further-polymerizable methylol-phosphorus compound is a reaction product of tetrakis hydroxy-methyl phosphonium chloride and urea.

4. Process of claim 2 in which the further-polymerizable methylol-phosphorus compound is a reaction product of tetrakis hydroxy-methyl phosphonium chloride and urea, the proportion of urea not exceeding 16 parts per 63 parts of the tetrakis hydroxy-methyl phosphonium chloride.

5. Process of claim 2 in which the further-polymerizable methylol-phosphorus compound is a reaction product of tetrakis hydroxy-methyl phosphonium chloride and urea and in which the aqueous solution thereof contains a buffer.

6. Process of claim 2 in which the further-polymerizable methylol-phosphorus compound is a reaction product of tetrakis hydroxy-methyl phosphonium chloride and urea and in which the aqueous solution thereof contains an ammonium salt of a weak acid as a buffer.

7. Process of claim 2 in which the further-polymerizable methylol-phosphorus compound is a reaction product of tetrakis hydroxy-methyl phosphonium chloride and urea and in which the aqueous solution thereof contains ammonium acetate as a buffer.

8. Process for improving the properties of a cellulose material, consisting essentially in incorporating in said material a further-polymerizable methylol-phosphorus polymeric material, containing at least one free methylol group attached to a phosphorus atom, and then exposing the material in the dry state to the action of gaseous ammonia for a period of from about 5 minutes to about 60 minutes followed by subjecting it to an aqueous ammonia treatment.

9. Process for improving the properties of a cellulose material, consisting essentially in incorporating in said material a further-polymerizable methylol-phosphorus polymeric material, containing at least one free methylol group attached to a phosphorus atom, and then exposing the material in the dry state to the action of gaseous ammonia for a period of from about 5 minutes to about 60 minutes followed by subjecting it to an aqueous ammonia treatment for a period of from about 5 minutes to about 60 minutes.

10. Process for improving the properties of a cellulose material, consisting essentially in incorporating in said material a further-polymerizable methylol-phosphorus polymeric material, containing at least one free methylol group attached to a phosphorus atom, and then exposing the material in the dry state to the action of gaseous ammonia followed by subjecting it to an aqueous treatment and thereafter washing and drying.

References Cited in the file of this patent

UNITED STATES PATENTS

| | | |
|---|---|---|
| 2,772,188 | Reeves et al. | Nov. 27, 1956 |
| 2,795,569 | Reeves et al. | June 11, 1957 |
| 2,812,311 | Reeves et al. | Nov. 5, 1957 |
| 2,930,106 | Wrotnowski | Mar. 29, 1960 |

FOREIGN PATENTS

| | | |
|---|---|---|
| 211,637 | Australia | Nov. 22, 1957 |